No. 718,161. PATENTED JAN. 13, 1903.
O. H. SCHILDBACK.
MOTOR VEHICLE.
APPLICATION FILED MAR. 23, 1902.
NO MODEL. 2 SHEETS—SHEET 1.
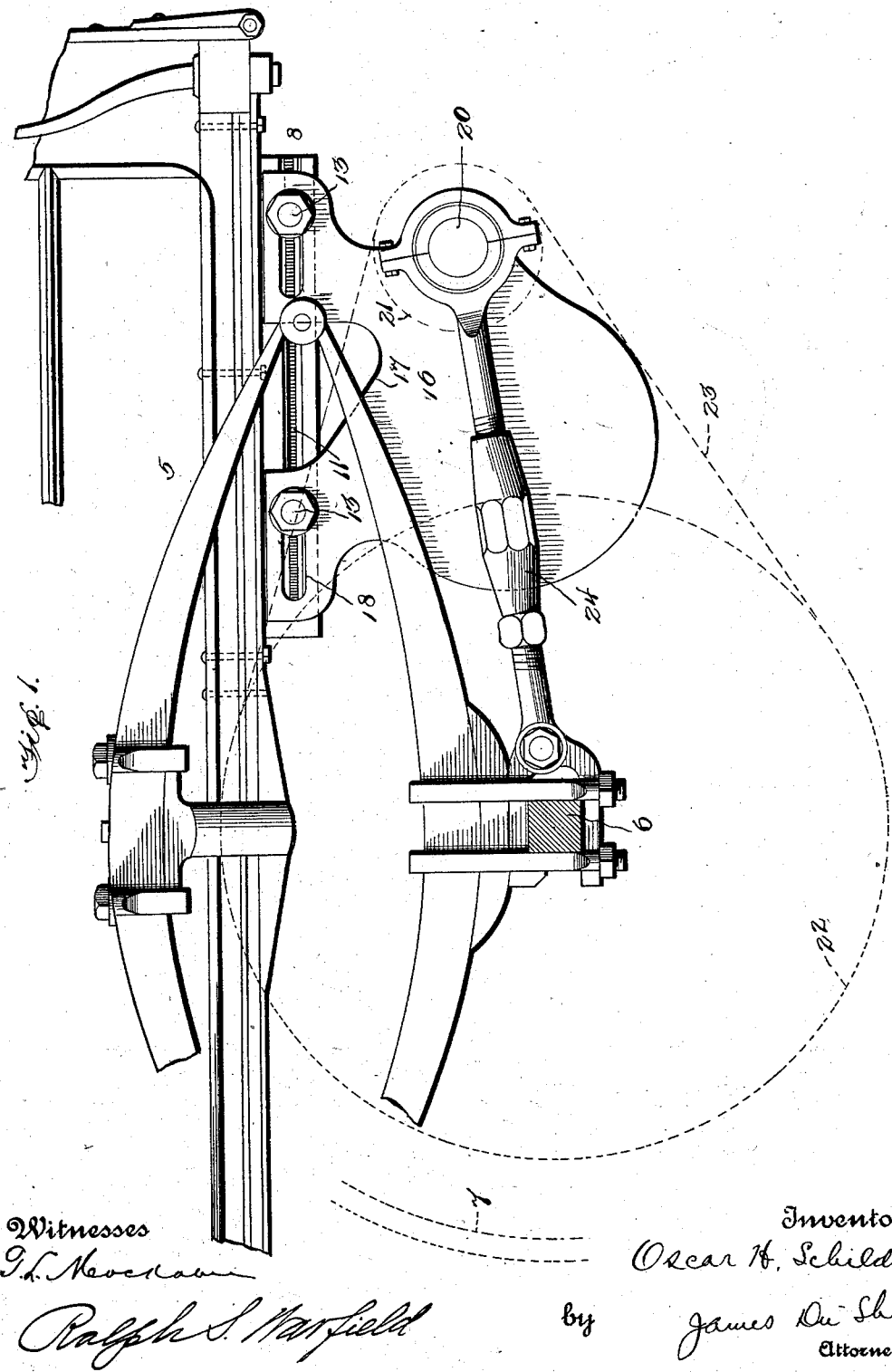
Witnesses
Inventor
Oscar H. Schildback,
by James Du Shane,
Attorney.

No. 718,161. PATENTED JAN. 13, 1903.
O. H. SCHILDBACK.
MOTOR VEHICLE.
APPLICATION FILED MAR. 28, 1902.
NO MODEL. 2 SHEETS—SHEET 2.
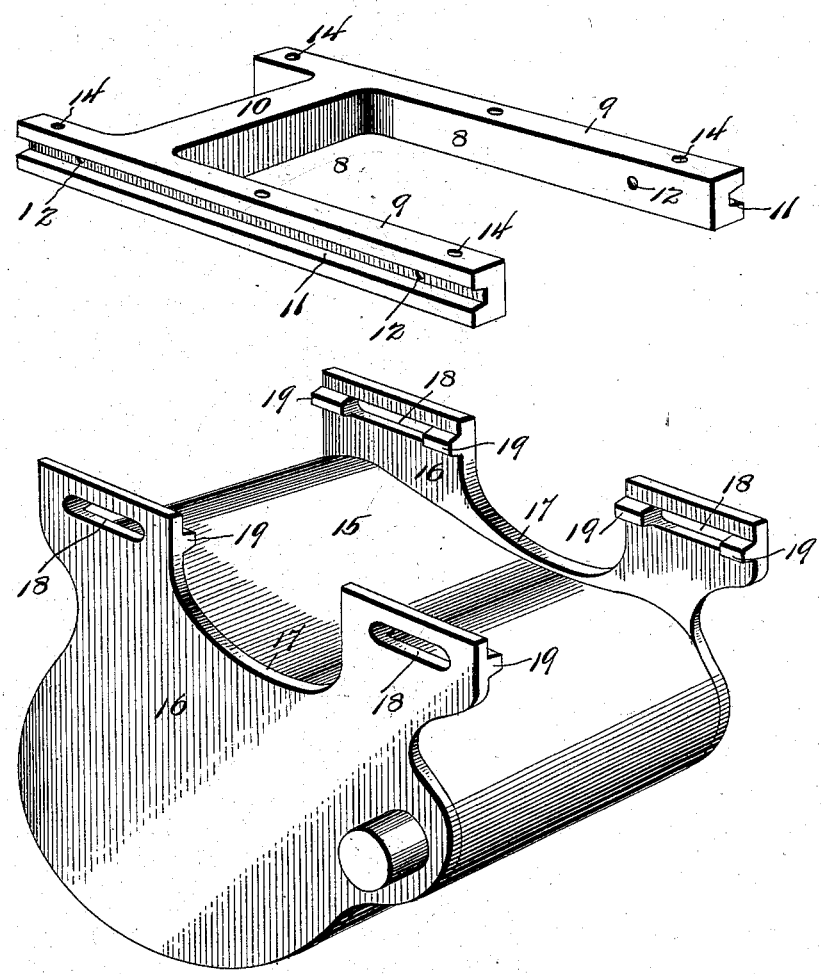

UNITED STATES PATENT OFFICE.

OSCAR H. SCHILDBACK, OF SOUTH BEND, INDIANA.

MOTOR-VEHICLE.

SPECIFICATION forming part of Letters Patent No. 718,161, dated January 13, 1903.

Application filed March 28, 1902. Serial No. 100,496. (No model.)

*To all whom it may concern:*

Be it known that I, OSCAR H. SCHILDBACK, a citizen of the United States, residing at South Bend, in the county of St. Joseph and State of Indiana, have invented certain new and useful Improvements in Chain-Adjusters for Electric-Motor Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in motor-vehicles, and has particular relation to means for adjustably and removably securing the motor to the vehicle.

The object of my invention is to provide, primarily, a support secured to the vehicle-body and having slideways to receive guides formed on end supports secured to the motor-frame to permit of an adjustable movement, the support being arranged to permit of such adjustable movement in alinement with the chain or other driving means connecting the motor and drive-shaft of the vehicle.

A further object is to provide a support and coöperating parts carried by the motor-frame to permit of a removable and adjustable mounting of the motor on the vehicle, whereby the motor may be disengaged from the vehicle without disturbing the remaining mechanism with the exception of a disconnection of the chain or other driving means.

Other and further objects will appear as the invention is hereinafter described.

With these and other objects in view my invention consists in the combination with a vehicle and a motor adapted to drive said vehicle and coöperating means carried, respectively, by the vehicle and the motor for permitting an adjustable and removable connection between the motor and vehicle; and it further consists in the improved construction and combination of parts hereinafter fully described, illustrated in the accompanying drawings, and particularly pointed out in the appended claims.

In the drawings, Figure 1 is a side elevation of a portion of a motor-vehicle and showing in side elevation a motor mounted in accordance with my invention. Fig. 2 is a perspective view of the support detached from the vehicle. Fig. 3 is a similar view showing the end supports for the motor and showing in conventional form a motor in position in said end supports.

Referring now to the drawings, 5 designates a vehicle-body of any preferred construction having the axle 6 and wheels 7, these parts being of usual construction. Secured to the under side of the vehicle-body or to an attachment carried thereby is a support 8 (best shown in Fig. 2) and comprising two parallel bars 9 9, connected intermediate the ends by a cross-bar 10, which may be integral with said bars 9 9, if desired, though such structure is not essential, each of said bars 9 9 having its outer face provided with a longitudinally-extending groove, slide, or recess 11, extending the entire length of such bars. Each bar is also provided with one or more laterally-extending openings 12 for the passage of bolts 13. Said bars may also be provided with vertically-extending openings 14 for the passage of bolts to permit of the attachment of the support to the body of the vehicle.

15 designates a motor of suitable construction and having its ends mounted in end supports 16 16, the latter being best shown in Fig. 3. As shown in said figure, each end support has its upper portion preferably formed with a recess 17, dividing said upper portion into two parts, as shown. Each of said parts is provided with a slot 18, extending intermediate the ends of said parts, the inner face of each of said parts in alinement with said slots being provided with inwardly-projecting lugs or projections 16. Said projections, lugs, or ribs are adapted to be placed within the groove or slide 11 of the support 8, thereby forming a sliding connection between said support and the two end supports in an obvious manner. By passing the bolts 13 through the slots 18 and the openings 12 it will be readily understood that the end supports may be held securely in any position they may be placed within the limit of the length of the slots 18 by a simple tightening of the bolts.

As shown in Fig. 2, one of the openings 12 may be extended through the cross-bar 10, in which case the bolt will be of a sufficient length to extend through both end supports, as well as the bars and cross-bars of the support, thereby tying the several parts into a substantially unitary structure.

20 designates the motor-shaft, on which is mounted a sprocket-wheel 21, connected to a sprocket-wheel 22, having an operative connection with the drive-wheels of the vehicle by a sprocket-chain 23, thus forming a positive driving connection between the motor and the wheels.

By the construction and arrangement of the support and end support above described it will be readily understood that the sprocket-chain 23 can always be maintained in a taut condition by a simple movement of the end supports on the support 8 and that it is only necessary to disconnect the sprocket-chain and withdraw the bolts 13 to permit of an entire removal of the motor as a unitary structure.

To provide an additional support for maintaining the motor in a position to hold the chain taut, I provide a connection between the axle 6 and the motor-shaft 20, as shown in Fig. 1, consisting of two rods connected by a turnbuckle 24 of suitable construction and arrangement. Inasmuch as the moving of said turnbuckle to a position where it will be disengaged from one of the rods, the removability of the motor hereinbefore described will not be prevented, while its connection not only provides substantially rigid support between the motor-shaft and axle, but also provides a means for readily moving the motor on its support when an adjustment is to be made, this latter being of advantage where a motor of considerable weight is employed.

Having thus described my invention, what I claim as new is—

1. In a motor-vehicle, the combination with the body portion having upon its under side a motor-support, said motor-support consisting of parallel bars grooved upon their outer sides, and a motor the upper end portions of which are provided with lugs or projections adapted to be adjustably and removably mounted in the said grooves of the parallel bars.

2. In a motor-vehicle, the combination with the body portion having attached to its under side adjacent to the rear end a motor-support, said motor-support consisting of grooved parallel bars, and a motor provided with means whereby it may be removably and adjustably supported by the said motor-support.

3. The combination with a vehicle and a motor therefor; of a support carried by the vehicle consisting of parallel bars each provided with an outer groove or slide; and end supports carried by the motor and provided with lugs or projections adapted to be placed in said groove or slide.

4. The combination with a vehicle and a motor therefor; of a support carried by the vehicle consisting of parallel bars connected together intermediate one end thereof and provided each with a groove or slide; and end supports carried by the said motor, said end supports being each provided with lugs or projections adapted to be placed within said grooves or slides.

5. The combination with a vehicle, and a motor therefor; of a support carried by the vehicle, consisting of two parallel bars connected together intermediate one end, the outer sides of said parallel bars being each provided with a groove or slide; end supports carried by said motor, said end supports being each provided with lugs or projections adapted to be placed within said slides or grooves.

6. The combination with a vehicle, and a motor therefor; of a support carried by the vehicle, comprising two parallel bars connected near one end thereof, and each of said parallel bars being provided with a groove or slide, said parallel bars being also provided with bolt-openings located at intervals within said grooves or slides; end supports carried by the said motor, said end supports being each provided with lugs or projections adapted to be placed within said grooves or slides, and also having slots intermediate said lugs or projections; and bolts adapted to be passed through the said slots and into the openings in the said parallel bars.

7. The combination with a vehicle, and a motor therefor; of a support carried by the vehicle and having longitudinally-extending grooves or slides, said grooves or slides being arranged longitudinally of the vehicle-body; end supports carried by said motor, said supports having lugs or projections adapted to be placed in said grooves or slides, said end supports also having slots; and bolts adapted to project through said slots and said support, whereby said motor may be moved adjustably and removably on and from said support in a direction longitudinally of the vehicle-body.

8. The combination with a vehicle, and a motor therefor; of a support carried by the vehicle, said support comprising two bars arranged parallel with each other and connected by a cross-bar, each of said bars having its outer face provided with a groove or slide, said grooves or slides being arranged longitudinally of the vehicle-body; end supports carried by said motor and having lugs or projections on their inner faces adapted to be placed within said grooves or slides, and also having slots intermediate of said lugs or projections; and bolts adapted to be passed through said slots and said bars, whereby said motor may be moved adjustably and removably on and from said support in a direction longitudinally of the vehicle-body.

9. The combination with a vehicle, and a motor, therefor; of a support carried by the vehicle, said support comprising two bars arranged parallel with each other and connected by a cross-bar, each of said bars having its outer face provided with a groove or slide, said grooves or slides being arranged longitudinally of the vehicle-body; end supports carried by said motor and having lugs or projections on their inner faces adapted to be placed within said grooves or slides, and also having slots intermediate said lugs or projections; bolts adapted to be passed through said slots and said bars; and an adjustable and removable connection between the motor-shaft and the axle of the vehicle, whereby said motor may be adjustably and removably moved on and from said support in a direction longitudinal of the vehicle-body, and supported against a movement toward the vehicle-axle.

In testimony whereof I affix my signature in presence of two witnesses.

OSCAR H. SCHILDBACK.

Witnesses:
JAMES DUSHANE,
J. M. CAULFIELD.